(12) United States Patent
Meeks et al.

(10) Patent No.: US 10,769,769 B2
(45) Date of Patent: Sep. 8, 2020

(54) DUAL MODE INSPECTOR

(71) Applicant: Zeta Instruments, Inc., San Jose, CA (US)

(72) Inventors: Steven W. Meeks, Palo Alto, CA (US); Rusmin Kudinar, Fremont, CA (US); Ronny Soetarman, Fremont, CA (US); Hung P. Nguyen, Santa Clara, CA (US); James Jianguo Xu, San Jose, CA (US)

(73) Assignee: KLA-TENCOR CORPORATION, Milpitas, CA (US)

( * ) Notice: Subject to any disclaimer, the term of this patent is extended or adjusted under 35 U.S.C. 154(b) by 218 days.

(21) Appl. No.: 15/200,586

(22) Filed: Jul. 1, 2016

(65) Prior Publication Data

US 2018/0005364 A1 Jan. 4, 2018

(51) Int. Cl.
*G06K 9/62* (2006.01)
*G06T 7/00* (2017.01)

(52) U.S. Cl.
CPC .......... *G06T 7/0004* (2013.01); *G06K 9/6201* (2013.01); *G06T 2207/10056* (2013.01); *G06T 2207/30148* (2013.01)

(58) Field of Classification Search
None
See application file for complete search history.

(56) References Cited

U.S. PATENT DOCUMENTS

| | | | | |
|---|---|---|---|---|
| 7,944,609 B2* | 5/2011 | Xu | .......................... | G02B 21/06 345/419 |
| 8,830,457 B1* | 9/2014 | Meeks | ................. | G01N 21/958 356/237.4 |
| 2003/0141879 A1* | 7/2003 | Wilsher | ............... | G01R 35/005 324/601 |
| 2004/0264764 A1* | 12/2004 | Kochi | ..................... | G01B 15/04 382/154 |
| 2007/0057184 A1* | 3/2007 | Uto | ................... | G01N 21/95607 250/310 |
| 2009/0030630 A1* | 1/2009 | Eitan | ................... | G01N 21/9501 702/81 |
| 2014/0055774 A1* | 2/2014 | Sugihara | ............ | G01N 21/9501 356/51 |
| 2015/0082498 A1* | 3/2015 | Meyer | ..................... | G01Q 30/02 850/1 |
| 2015/0098655 A1* | 4/2015 | Chang | ................. | G06K 9/00543 382/192 |
| 2016/0211112 A1* | 7/2016 | Nakao | ................... | H01J 37/226 |

* cited by examiner

*Primary Examiner* — David Perlman
(74) *Attorney, Agent, or Firm* — Imperium Patent Works LLP; Mark D. Marrello

(57) ABSTRACT

A dual mode inspector includes an optical inspector configured to detect a defect located at a first location on a sample, a microscope configured to capture an image of the defect at the first location on the sample, and a platform that is configured to support the sample. The sample is not removed from the platform between the detecting of the defect located at the first location on the sample and the capturing of the image of the defect at the first location on the sample. The dual mode optical inspector also includes a controller that causes the optical inspector to detect the defect located at the first location on the sample and causes the microscope to capture the image of the defect at the first location on the sample. The dual mode inspector also performs scanning lens distortion correction to improve the capturing of defect images.

22 Claims, 10 Drawing Sheets

DUAL MODE INSPECTOR WITH STATIONARY PLATFORM

DUAL MODE INSPECTOR WITH STATIONARY PLATFORM

DUAL MODE INSPECTOR WITH STATIONARY PLATFORM

DUAL MODE INSPECTOR WITH MOVABLE PLATFORM

FIG. 4 OPTICAL INSPECTOR TOP VIEW

SAMPLE DEFECT MAPPING FROM OPTICAL INSPECTOR

3-D IMAGE OF DEFECT DETECTED AT POSITION (X1, Y1)

3-D IMAGE OF DEFECT DETECTED AT POSITION (X2, Y2)

SCAN BEAM DISTORTION DUE TO SCANNING LENS

SAMPLE TO PLATFORM POSITIONAL VARIANCE DUE TO REMOVAL OF SAMPLE FROM PLATFORM

DUAL MODE INSPECTOR FLOWCHART

DUAL MODE INSPECTOR WITH
OPTICAL SCANNING LENS DISTORTION CORRECTION FLOWCHART

DUAL MODE INSPECTOR

TECHNICAL FIELD

The described embodiments relate generally to detecting a defect on a sample and capturing an image of the detected defect on the sample, and more particularly to do so with high accuracy and reliability.

BACKGROUND INFORMATION

Detection of a defect on a sample by an optical inspector indicates the location and type of the defect on the sample. In the event an image of the detected defect is desired, the platform location is recorded and the sample is removed from a first platform included in optical inspector. The sample is then placed on a second platform included in a microscope. The second platform included in the microscope is then adjusted such the recorded location. Once the second platform is adjusted to the recorded location, an image of the sample at that location is captured.

SUMMARY

In a first novel aspect, a dual mode inspector includes an optical inspector configured to detect a defect located at a first location on a sample, a microscope configured to capture an image of the defect at the first location on the sample, and a platform that is configured to support the sample. The sample is not removed from the platform between the detecting of the defect located at the first location on the sample and the capturing of the image of the defect at the first location on the sample. The dual mode optical inspector also includes a controller that causes the optical inspector to detect the defect located at the first location on the sample and causes the microscope to capture the image of the defect at the first location on the sample.

In a second novel aspect, a method includes (a) detecting a defect located at a first location on a sample, (b) determining if an image of the defect located at the first location on the sample is to be captured, (c) if it is determined that the image is to be captured in (b), then capturing an image of the defect located at the first location on the sample, (d) if it is determined that the image is not to be captured in (b), then not capturing an image of the defect located at the first location on the sample, (e) maintaining alignment of the sample to a platform that supports the sample between the detecting of (a) and the capturing of (c), and (f) storing the captured image on a storage device. The captured image is associated with the detected defect.

In a third novel aspect, a dual mode inspector includes an optical inspector that detects a defect located at a first location on a sample, a microscope that captures an image of the defect located at the first location on the sample. The optical inspector and the microscope are included in a single enclosure. The dual mode inspector also includes a first means for maintaining alignment of the sample on a platform during the time between detecting of the defect and the capturing of the image, and a second means for converting a second location where the optical inspector is setup to detect a defect on the sample to a first location on the sample where the defect is located.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
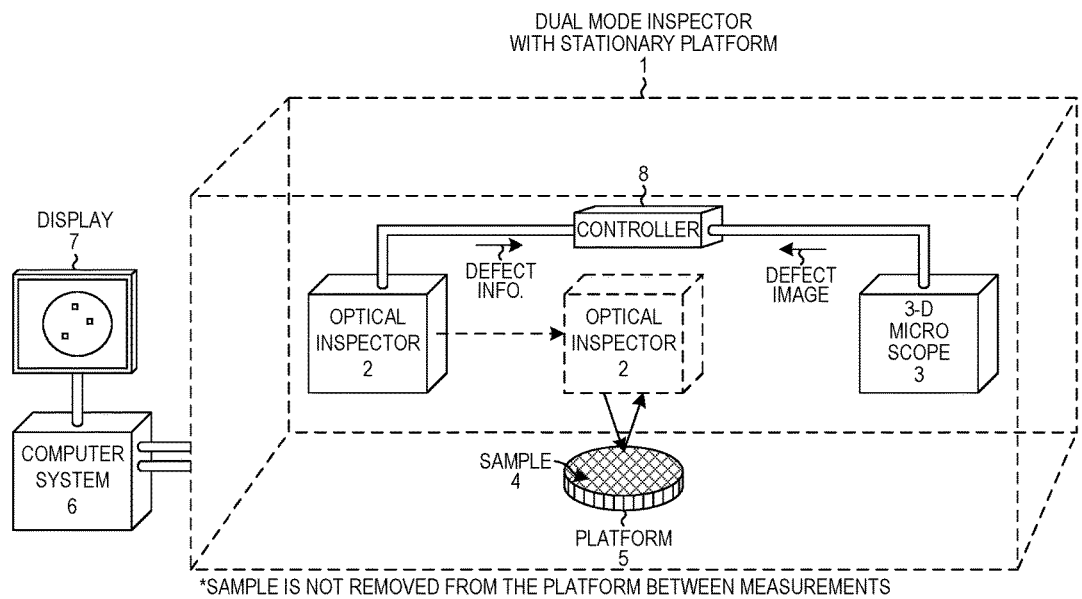
FIG. 1 is a first diagram of the dual mode inspector 1 with a stationary platform.

Reference will now be made in detail to background examples and some embodiments of the invention, examples of which are illustrated in the accompanying drawings. In the description and claims below, relational terms such as "top", "down", "upper", "lower", "top", "bottom", "left" and "right" may be used to describe relative orientations between different parts of a structure being described, and it is to be understood that the overall structure being described can actually be oriented in any way in three-dimensional space.

During the fabrication of transparent or opaque samples (also referred to transparent work pieces, transparent layers, transparent wafers, transparent solids and transparent discs) unwanted defects can be produced. These unwanted defects include a top surface particle, a bottom surface particle, a stress field, an internal flaw, a top surface pit, a bottom surface pit, top and bottom surface cracks, top and bottom surface stains, top and bottom surface scratches. These defects may occur in various locations on the transparent or opaque sample. These defects result in undesirable results such as reduced operating life of a resulting display device, non-functionality of the resulting display device, and degraded performance (light efficiency) of the resulting display device. It is valuable for a display manufacturer to detect these defects before additional resources are spent developing a product that will not function properly due to wafer level defects. For example, a top surface particle may produce unwanted shielding on the top surface of the transparent sample and may interfere with the ability to focus a lithography pattern on the surface. Particles on the top surface may also cause electrical shorts to appear when metal lines are deposited on this surface. In addition to detecting the presence of one of these defects on a sample, it is also beneficial to capture an image of these defects. In one example, an image of a detected defect can be used to gain further information as to specific dimensions of the defect. In addition to capturing an image of a defect it is useful to determine its height or depth by using a microscope which incorporates an optical profiler. For additional information regarding a microscope incorporating an optical profiler, see: U.S. patent application Ser. No. 12/699,821 (U.S. Pat. No. 7,944,609) entitled "3-D OPTICAL MICROSCOPE" filed on Feb. 3, 2010 (the entire subject matter of which is incorporated herein by reference).

In another example, an image of the detected defect can be used to calibrate an optical inspector that detected the defect in the first place. An example of an optical inspector is provided in FIG. 4. In this fashion, the optical inspector may detect a specific type of defect at specific location on the sample. An image of the defect is then captured by the microscope. The captured image may indicate that the defect is a different type of defect than the type of defect detected by the optical inspector. Information regarding the actual type of defect that is present on the sample can be used to adjust or reconfigure the optical inspector so to improve the accuracy of defect detection by the optical inspector.

Figure 10:
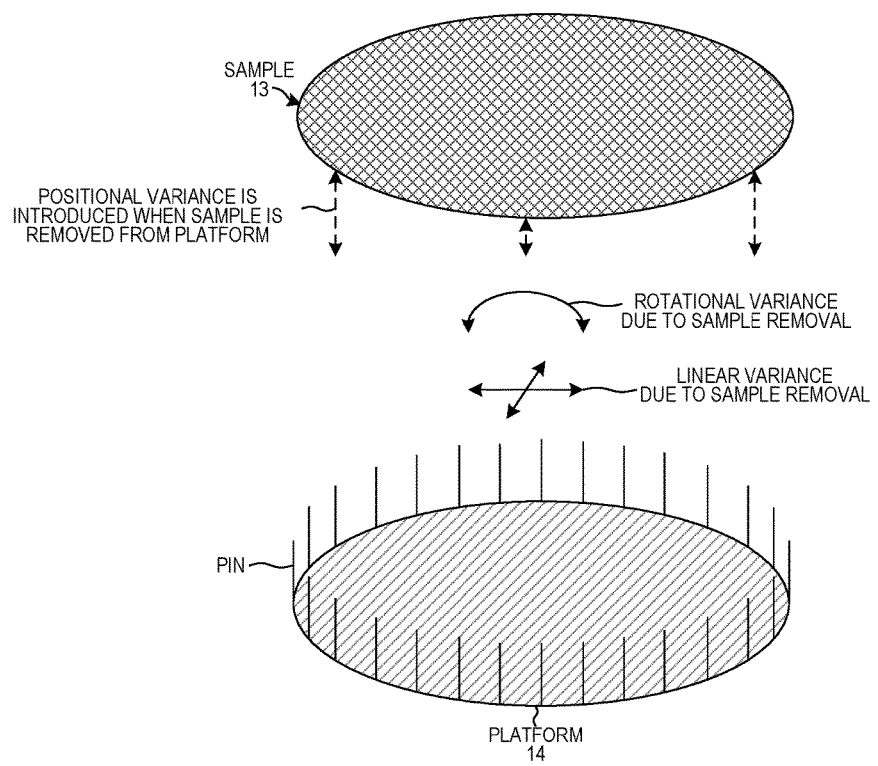
FIG. 10 is a diagram illustrating different sources of sample to platform misalignment.

As discussed in the Background, current solutions require a sample to be removed from a first platform included in an optical inspector and mounted to a second platform included in a microscope in order to capture images of detected defects. The removing of the sample from the first platform and then mounting the sample to the second platform causes error between the measured location of the defect with respect to first platform and the actual location of the defect with respect to the second platform. While attempts exist to remedy this misalignment between a sample and various platforms due to mounting tolerances, no existing remedy provides a perfect solution. Rather, as shown in FIG. 10, once a sample is removed from a first platform both rotational variance and linear variance with respect to the sample's alignment with the platform is introduced. While, these variances may seem small, they are actually extremely large with respect to the size of the defects being detected. For example, a detected defect may be on the order of only a few micrometers in length. Therefore, when the microscope is focused to capture a ten micrometer by ten micrometer image, a few micrometers of misalignment due to the movement of the sample with respect to the platform will cause the microscope to miss the defect all together. Moreover, small variations between platforms also introduce a second source of misalignment between different platforms even when ignoring misalignment caused by moving a sample between platforms. For these various reasons, a solution is needed that allows the detecting of defect and subsequent capturing of images of the defects with sufficient precision to guarantee that an image of a specific defect can reliably be captured.

Dual Mode Inspector with Stationary Platform

FIG. 1 is a first diagram of a dual mode inspector 1 with a stationary platform. Dual mode inspector 1 includes an optical inspector 2, a three-dimensional (3D) microscope 3, a stationary platform 4 that is configured to support a sample 4, and a controller 8. As shown in FIG. 1, the dual mode inspector 1 may also include a computer 6 and a display 7.

In one embodiment, the computer 6 communicates with controller 8 via a bus, such as Universal Serial Bus (USB) or RS-232. In another embodiment, the computer 6 communicates with controller 8 via a network connection, such as ethernet or Wi-Fi connection, where the networking enabled controller includes a network port and network controller. The network connection may utilize a TCP/IP protocol.

In one embodiment, the controller 8 communicates with the optical inspector 2 via a bus, such as a Universal Serial Bus (USB) or RS-232. In another embodiment, the controller 8 communicates with the optical inspector 2 via a network connection, such as ethernet or Wi-Fi connection, where the optical inspector 2 includes a network port and network controller. The network connection may utilize a TCP/IP protocol.

In one embodiment, the controller 8 communicates with the 3D microscope 3 via a bus, such as a Universal Serial Bus (USB) or RS-232. In another embodiment, the controller 8 communicates with the 3D microscope 3 via a network connection, such as ethernet or Wi-Fi connection, where the 3D microscope 3 includes a network port and network controller. The network connection may utilize a TCP/IP protocol.

In another embodiment, the dual mode inspector does not include a controller. Rather, both the optical inspector 2 and the 3D microscope 3 both communicate with computer 6 directly. The optical inspector 2 and 3D microscope 3 may communicate with the computer 6 via a bus, such as a Universal Serial Bus (USB) or RS-232. The optical inspector 2 and 3D microscope 3 may also communicate with the computer 6 via a network connection, such as ethernet or Wi-Fi connection, where both the optical inspector 2 and the 3D microscope 3 includes a network port and network controller. The network connection may utilize a TCP/IP protocol.

Figure 5:
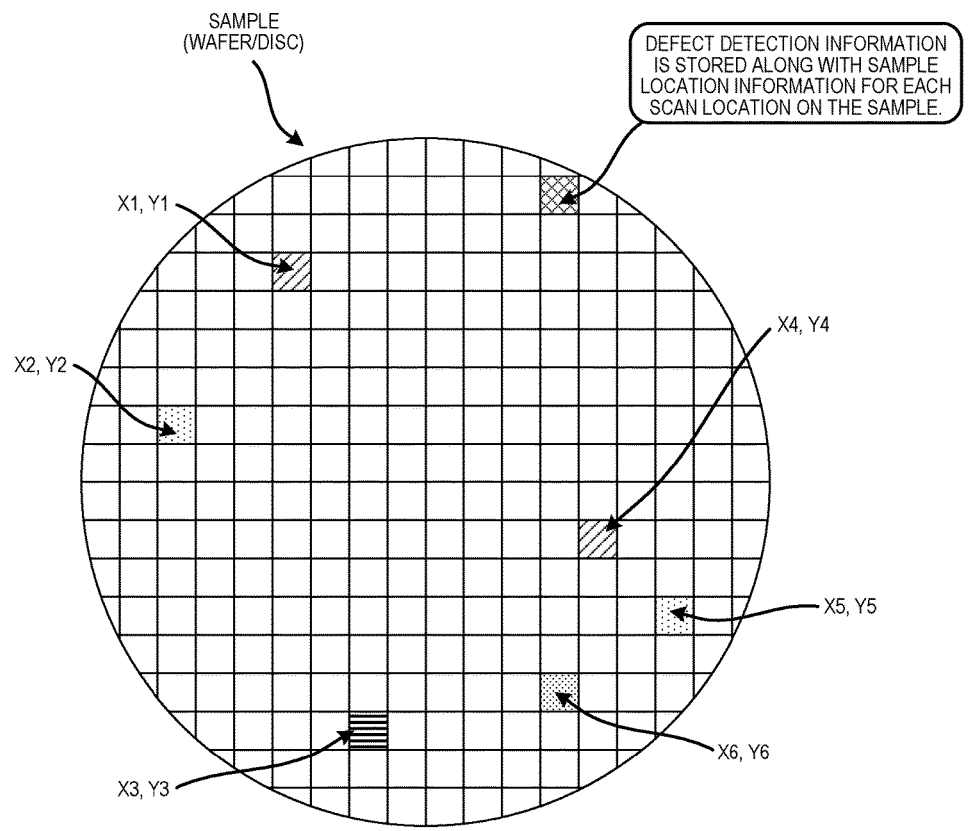
FIG. 5 is a diagram of defect mapping of a single sample.

In operation, a sample (or "wafer") is placed on the platform 5 for defect testing. The controller 8 receives a start defect scan instruction from the computer 8 and causes the optical inspector 2 to be positioned proximate to the sample 4 (as shown in FIG. 1). The term "proximate to" in the present application refers to a location where the optical inspector can accurately detect defects on the sample. The controller then causes the optical inspector to start the inspection process. The optical inspector detects a defect on the sample and communicates defect information associated with the detected defect to the controller. In one embodiment, the controller stores the defect information associated with the detected defect in a local memory included in or attached to the controller. In another embodiment, the controller stores the defect information associated with the detected defect in a memory included in or attached to the computer 6. An example of the type of information included in the defect information is illustrated in FIG. 5. FIG. 5 shows defect mapping information for various defects detected on the sample. The location of each defect (X,Y) is stored along with the type of defect detected at that location. As shown in FIG. 5, types of defects may include surface particle defects, surface pit defects, surface crack defects, surface stain defects, scratch defects and stress field defects.

Figure 2:
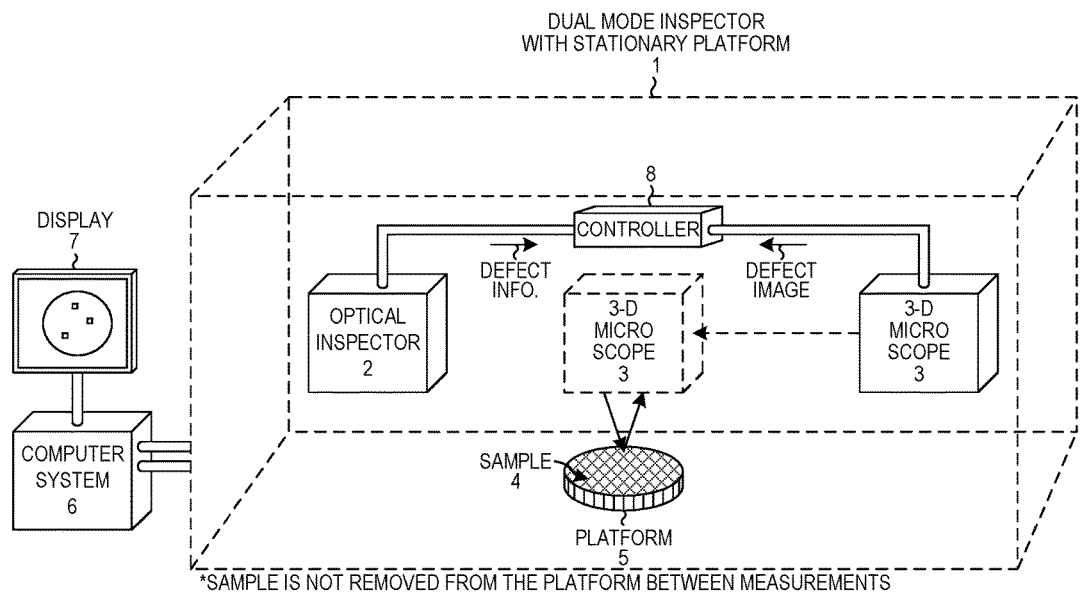
FIG. 2 is a second diagram of the dual mode inspector 1 with a stationary platform.
Figure 6:
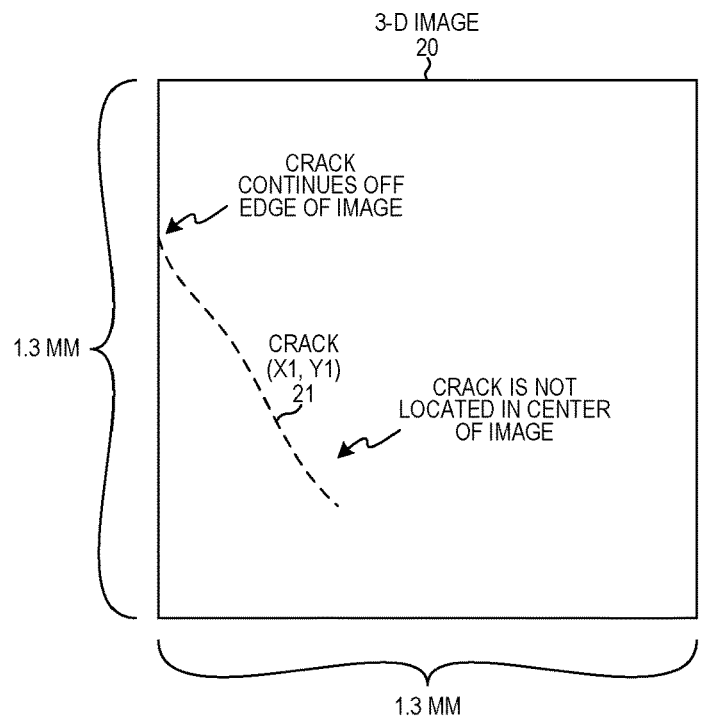
FIG. 6 is a diagram of a captured image centered at (X1,Y1).

The controller then causes the optical inspector to be positioned away from the optical inspector. In the present application the term "positioned away from" refers to a location far enough away from the sample such that another device can be moved proximate to the sample. Once the optical inspector is positioned away from the sample, the controller causes the 3-D microscope to be positioned proximate to the sample, as is shown in FIG. 2. More precisely, the 3-D microscope is positioned such that the 3-D microscope is focused on the same location on sample where a particular defect was detected by the optical inspector. The 3-D microscope then captures one or more images of the sample at the defect location. In one example, the image of the sample at the defect location is approximately one millimeter by one millimeter. An example of a captured image is illustrated in FIG. 6.

The positioning of the optical inspector 2 and the 3-D microscope can be achieved by various means. For example, the optical inspector 2 or 3-D microscope 3 can be mounted to an electronically controlled truck that rides on a two-dimensional track, where the wheels of the truck are propelled by an electric motor. In another example, the optical inspector 2 or the 3-D microscope 3 can be attached to an electronically controlled lever-arm. In either example, the controller 8 causes the optical inspector 2 and the 3-D microscope 3 to be moved into a specific position by sending an electrical signal to a motor that moves the optical inspector or 3-D microscope to a different position.

In one embodiment, a human user can control the operation of the dual mode inspector 1 via display 7. In one example, the display 7 is a touch-screen display that allows the human user to select different options by touching the screen directly. In another example, the computer 6 includes other human input devices, such as a keyboard, mouse, or microphone (not shown). Either way, the human user is able to control when the dual mode inspector begins the defect detection processes. Once a defect is detected, the user is prompted with information associated with the detected defect. At that point, the human user can choose to capture an image of the sample at the location where the defect was detected. Alternatively, the human user can choose to not capture an image of the sample at the location where the defect was detected.

In another embodiment, the dual mode inspector 1 operates autonomously from human interaction. Rather, the dual mode inspector 1 is setup before inspection of the sample and then automatically inspects an inserted sample for defects and then automatically captures images of detected defects automatically. In this embodiment, due to the relatively large amount of time required to capture an image of a defect, the dual mode inspector may limit the total number of defect images that are captured. In one example, the dual mode inspector will only capture a certain number of images for each type of defect detected on the sample. In another example, the dual mode inspector will only capture images of detected defects that more than a certain distance apart. In yet another example, the dual mode inspector will only capture a certain number of images of detected defects of different types of defects within a specific area of the sample.

The sample 4 in FIG. 1 is approximately one millimeter thick and transparent. No other materials directly abut the top surface or bottom surface of the transparent sample. Rather, the top surface and bottom surface of the transparent sample abuts open air. Another typical means of supporting the transparent sample is to use a set of pins that support the bottom of the sample at regular intervals as shown in FIG. 10. It is noted herein, that other types of platforms exist and may be used to support a transparent sample. For example, a flat surface upon which the transparent sample rests may be used as a platform. In the flat surface example, the flat surface would contact the entire bottom surface of the transparent sample (therefore the bottom surface of the sample would not abut open air, but rather the transporting surface directly).

It is noted herein, the example of glass is used for exemplary use only. This disclosure is not limited to the detection of defects on glass. Rather, this disclosure is applicable to all transparent or opaque samples or wafers or discs regardless of the specific material constituting the sample/wafer/disc or the end device to be manufactured with the developed sample/wafer/disc. For example, silicon is opaque in the visible range of the spectrum but transparent in the infrared spectrum. Transparent or opaque samples may include at least the following materials: glass, plastic, quartz, sapphire, silicon, Silicon Carbide (SiC), and Gallium Nitride (GaN).

The use of the 3-D microscope 3 is only exemplary in FIG. 1 and FIG. 2. A 3-D microscope can be replaced by a 2-D microscope to capture images of the detected defect as well. As such, the disclosure of this application is not limited to the use of a 3-D microscope to capture images of detected defects. For additional information regarding the structure and operation of a 3-D microscope, see: U.S. patent application Ser. No. 12/699,821 (U.S. Pat. No. 7,944,609) entitled "3-D OPTICAL MICROSCOPE" filed on Feb. 3, 2010 (the entire subject matter of which is incorporated herein by reference).

Figure 4:
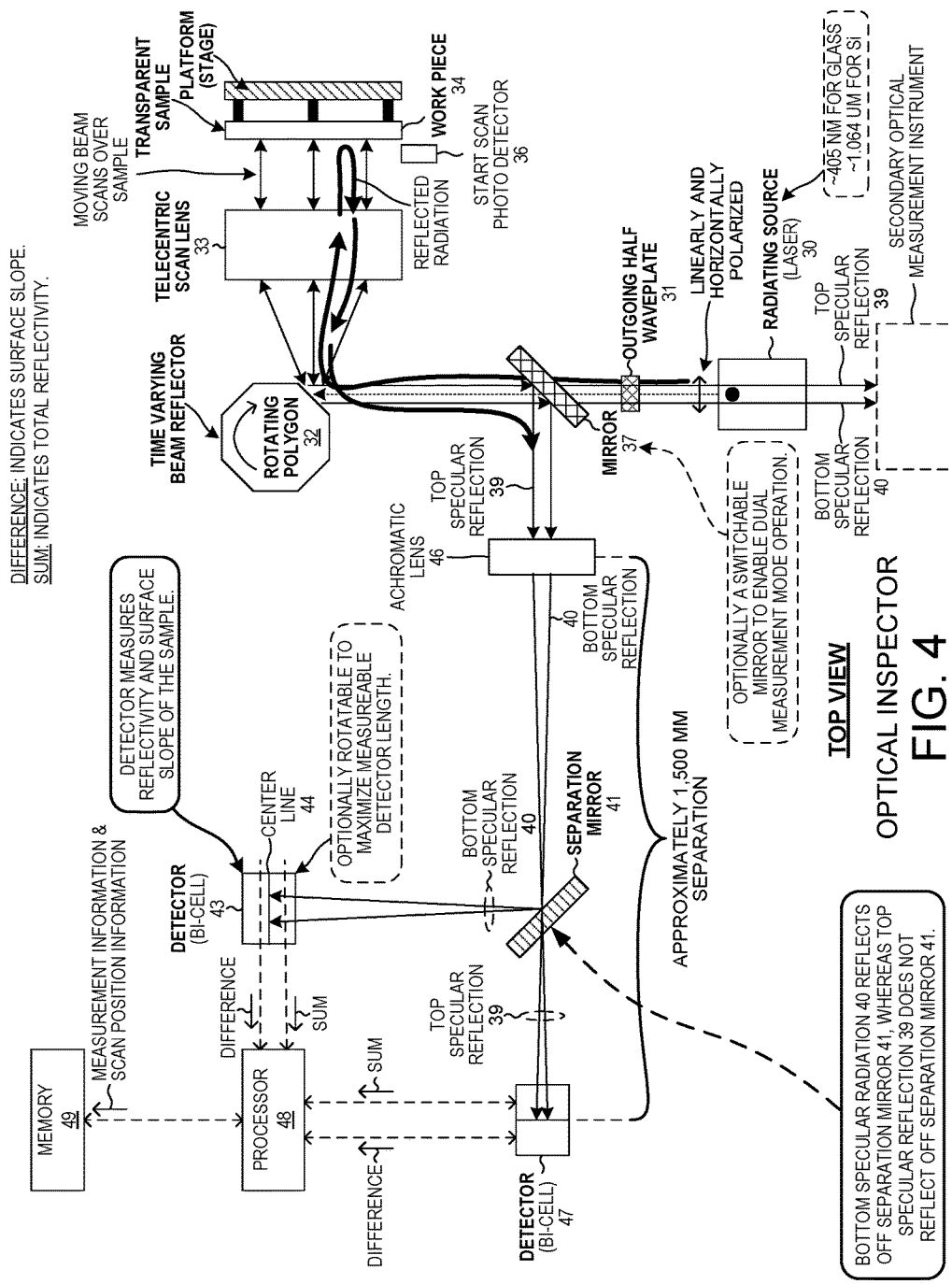
FIG. 4 is a detailed diagram of an optical inspector.

The optical inspector is shown in greater detail in FIG. 4. More specifically, FIG. 4 is a top view diagram of an optical inspector. The optical inspector includes a radiating source 30, an outgoing half waveplate 31, a time varying beam reflector (rotating polygon 32), a telecentric scan lens 33, a start of scan detector 36, a first mirror 37, a focusing lens 46, a separation mirror 41, a first photo detector 43, a second detector 47, a processor 48, and a memory 49. It is noted herein, the use of rotating polygon is exemplary. Any time varying beam reflector, such as a resonant galvanometer, a rotating double sided mirror, or acousto-optic beam deflector can be utilized as well.

The radiating source 30 irradiates outgoing half waveplate 31 with a source beam. In one example, the radiating source 30 is a laser. Outgoing half waveplate 31 allows the linear polarization of laser to be rotated to a desired angle. The rotated linearly polarized beam is directed by the rotating polygon 32 to a first location on the telecentric scan lens 33. The angle at which the source beam approaches the telecentric scan lens 33 depends upon the angle of rotation of the rotating polygon 32 when the source beam contacts the rotating polygon 32. However, regardless of the angle at which the source beam approaches the telecentric scan lens 33, the telecentric scan lens 33 directs the source beam to a work piece 34 at an angle that is substantially normal to the surface of the work piece 34. In one example, the work piece 34 is the transparent sample (work piece 2) shown in FIG. 1 and the telecentric scan lens 33 directs the source beam to the work piece 34 at an angle of approximately three degrees from normal.

The source beam directed, at a substantially normal angle, to the work piece 34 generates a reflection of the source beam. A first portion of the reflected source beam is specular reflection. A second portion of the reflected source beam is near specular scattered radiation. Specular reflection is the mirror-like reflection of light from a surface, in which light from a single incoming direction is reflected into a single outgoing direction (in adherence with the law of reflection). Near specular scattered radiation is light which is scattered (or deflected) by defects in a region which is just outside the profile of the specular beam. Measuring both the specular reflection and the near specular scattered radiation allows the detection of defects which may not be visible in the specular reflection alone. Near specular scattered radiation is referred to as scatter radiation herein.

As discussed above, the specular reflection includes top surface specular reflection and bottom surface specular reflection from the transparent sample (work piece 34). The reflected radiation, including top surface specular reflection 39 and bottom surface specular reflection 40, is reflected back to the telecentric scan lens 33. The telecentric scan lens 33 directs the top surface specular reflection 39 and the bottom surface specular reflection 40 to the rotating polygon 32. The rotating polygon 32 directs the top surface specular reflection 39 and bottom surface specular reflection 40 back toward the radiating source 30. At this point, separating the source beam from the reflected light would be impractical if both the source beam and the reflected beams were traveling in the same space. To avoid this problematic situation, the radiating source 30 is placed at a location at an offset from the central axis of the telecentric scan lens 33. This directs the reflected radiation away from the radiating source 30 without altering the source beam radiating from the radiating source 30.

Mirror 37 reflects both top surface specular reflection 39 and bottom surface specular reflection 40 to focusing lens 46. Focusing lens 46 focuses both the top surface specular reflection 39 and the bottom surface specular reflection 40 to a focal point. In one example, the focusing lens 46 is an achromatic lens. Separation mirror 41 is located approximately at the focal point of focusing lens 46. Examples of various shapes of the separation mirror are shown in FIG. 16. At this point of focus, the top surface specular reflection 39 is physically separated from the bottom surface specular reflection 40. This separation is illustrated in FIG. 21. The separation mirror 41 is positioned to reflect the bottom surface specular reflection 40 while not affecting the propagation of top surface specular reflection 39. Separation mirror 41 reflects the bottom surface specular reflection 40 toward detector 43 while allowing top surface specular reflection 39 to continue to detector 47. Thus, detector 43 is irradiated by the bottom surface specular reflection 40 and detector 47 is irradiated by top surface specular reflection 39.

The detector 43 is located such that the bottom surface specular reflection 40 should irradiate the center of detector 43. In one example, detector 43 is a bi-cell detector. In this example, the bottom surface specular reflection irradiates the bi-cell detector 43 on the center line 44 between the two photodiodes included in the bi-cell detector 43. In the event that the bottom surface slope (the "micro-waviness") of the work piece is not normal to the source beam, the resulting bottom surface specular reflection 40 will deviate from the center line 44. A deviation from the center line 44 will cause a greater amount of the bottom surface specular reflection 40 to irradiate one of the two photodiodes in the bi-cell detector 43. In response, the bi-cell detector 43 will output an increased difference value indicating a change in the slope of the bottom surface of the work piece 34. A negative difference value indicates a slope varying in a first direction. A positive difference value indicates a slope varying in a second direction. The slope measured is the surface slope of the bottom surface of the work piece 2 in direction perpendicular to the optical scan line. Regardless of the deviation of the bottom surface specular reflection 40 from the center line 44, the bi-cell detector 43 will output a sum value indicating the intensity of the bottom surface specular reflection 40 from work piece 34. For additional information regarding measurement of surface slope, see: U.S. patent application Ser. No. 13/861,383 (U.S. Pat. No. 8,848,181) entitled "MULTI-SURFACE SCATTERED RADIATION DIFFERENTIATION" filed on Apr. 12, 2013 (the entire subject matter of which is incorporated herein by reference).

The detector 47 is located such that the top surface specular reflection 39 should irradiate the center of detector 47. In one example, detector 47 is a bi-cell detector. In this example, the top surface specular reflection irradiates the bi-cell detector 47 on the center line between the two photodiodes included in the bi-cell detector 47. In the event that the top surface slope (the "micro-waviness") of the work piece is not normal to the source beam, the resulting top surface specular reflection 39 will deviate from the center line. A deviation from the center line will cause a greater amount of the top surface specular reflection 39 to irradiate one of the two photodiodes in the bi-cell detector 47. In response, the bi-cell detector 47 will output an increased difference value indicating a change in the slope of the top surface of the work piece 34. A negative difference value indicates a slope varying in a first direction. A positive difference value indicates a slope varying in a second direction. The slope measured is the surface slope of the top surface of the work piece 2 in direction perpendicular to the optical scan line. Regardless of the deviation of the bottom surface specular reflection 39 from the center line, the bi-cell detector 47 will output a sum value indicating the intensity of the top surface specular reflection 39 from work piece 34.

In one embodiment, the radiating source is a four hundred and five nanometer laser and the work piece is glass. In another embodiment, the radiating source is a one thousand and sixty-four nanometer laser and the work piece is silicon.

In another embodiment, detector 43 is rotatable about the optical axis of the bottom surface specular reflection 40 and detector 47 is rotatable about the optical axis of the top surface specular reflection 39.

In yet another embodiment, the optical path length between the focusing lens and the first detector is approximately one-thousand, five-hundred millimeters.

In one example, a processor 48 is also included in the top and bottom surface optical inspector shown in FIG. 14. The processor 48 receives a difference output signal from bi-cell detector 43, a sum output signal from bi-cell detector 43, a difference output signal from bi-cell detector 47, and a sum output signal from bi-cell detector 47. In response, processor 48 determines: if defects are present at the scan location on the work piece 34, if the defect is located on the top surface of the work piece 34, if the defect is located on the bottom surface of the work piece 34, and if the defect is located internal to the work piece 34.

The processor may also communicate with a motor controlling rotating polygon 32. The processor may increase or decrease the rate of rotation of the rotating polygon 32. For example, when switching from using a high-bandwidth detector to a low-bandwidth detector, it may be required that the rate of rotation of the rotating polygon 32 be decreased. Alternatively, when switching from using a low-bandwidth detector to a high-bandwidth detector, it may be necessary to increase the rate of rotation of the rotating polygon 32.

In another example, memory 49 is included in the top and bottom surface optical inspector shown in FIG. 14. Memory 49 stores information output by processor 48. (i.e. defect location information, or defect indicator information). Memory 49 also stores location information indicating the location on the work piece which was scanned to measure the defect information or defect indicator information. Defect information includes a status as to whether the scanned location on the work piece contains a defect and on which surface the defect present at the location. Defect indicator information includes various measurements from the scanned location on the work piece (i.e. top surface slope, bottom surface slope, top surface specular reflection intensity, and bottom surface specular reflection intensity).

In one example, the scan of the work piece is done with the polygon rotating at a high speed and the data sampling of the bi-cell detector is run at approximately 16 MHz with the radiating source running at full intensity. Since the rotating polygon can rotate at high speeds, an entire 100 mm diameter work piece can be measured in about ten seconds.

In another example, the rotating polygon begins to spin upon power up of the device and continues to spin until the entire device is powered off. The constant spinning of the rotating polygon during operation is beneficial in that spin-up and spin-down delay time is eliminated during regular operation. The work piece is moved in one direction (not shown) by a precision stage to make a map of the entire work piece surface. In one embodiment, shown in FIG. 14, the optical inspector includes a start of scan photodetector 36 which is placed at the edge of the scan line and serves to trigger the acquisition of data sampling when the scanned beam passes over the detector 36.

This above process is repeated as the work piece 34 is moved underneath the optical inspector. A precision stage controller directs the movement of the work piece 34 during the inspection process. In one example, the processor 48 outputs defect inspection data which is logged along with the work piece scan location. The number and location of defects on the work piece will determine the disposition of the work piece. In one example, depending upon the location and type of defect, some portions of the work piece may be useful and others portions of the work piece may be discarded. In another example, if the work piece has many defects then the entire work piece may be discarded.

It is noted herein, that bi-cell detectors 43 and 47 are of exemplary use in this disclosure. One skilled in the art will readily realize that the bi-cell detectors 43 and 47 may be replaced with various multi-cell detectors to achieve the utility of the present invention.

In another embodiment, mirror 37 is a switchable mirror that can be adjusted to not reflect the top and bottom surface specular reflections 39 and 40. A switchable mirror 37 allows for a single optical inspector including two different optical measurement instruments to select between the use of either optical measurement instrument by simply switching the position of mirror 37. For additional information regarding structure and operation of an optical inspector, see: U.S. patent application Ser. No. 15/159,626 entitled "MULTI-SURFACE SPECULAR REFLECTION INSPECTOR" filed on May 19, 2016 (the entire subject matter of which is incorporated herein by reference).

Dual Mode Inspector with Movable Platform

Figure 3:
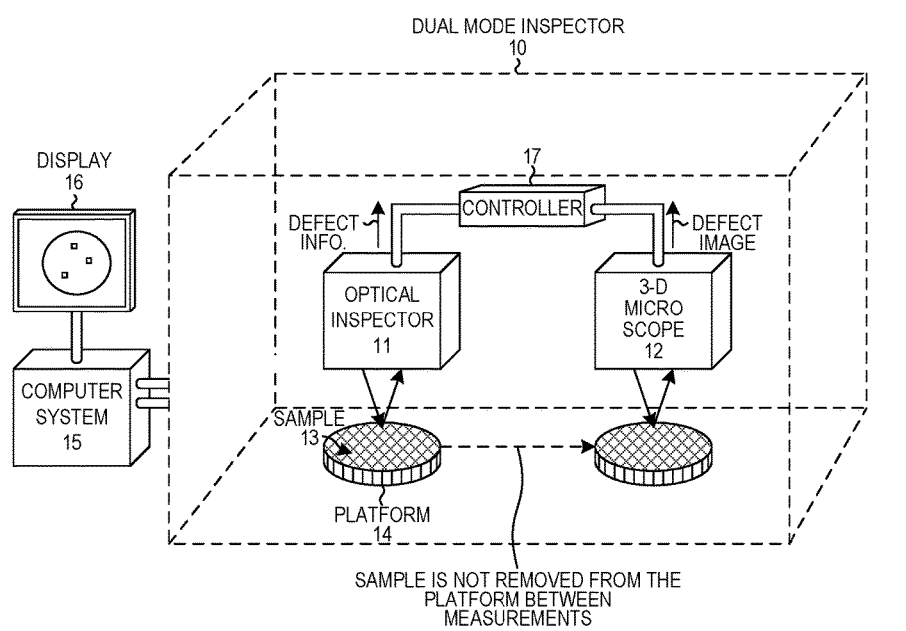
FIG. 3 is a diagram of a dual mode inspector 10 with a movable platform.

FIG. 3 is a diagram of a dual mode inspector 10 with a movable platform.

Dual mode inspector 10 includes an optical inspector 11, a 3-D microscope 12, a platform 14 configured to support a sample 13, and a controller 17. As shown in FIG. 3, the dual mode inspector 10 may also include a computer 15 and a display 16. In one example, the computer 15 communicates with controller 17 via a bus, such as Universal Serial Bus (USB) or RS-232 (not shown). In another example, the computer 15 communicates with controller 17 via a network connection, such as ethernet or Wi-Fi connection. The networking enabled controller includes a network port and network controller.

In operation, a sample (or "wafer") is placed on the platform 14 for defect testing. The controller 17 receives a start defect scan instruction from the computer 15 and causes the sample 13 to be positioned proximate to the optical inspector 11 (as shown in FIG. 3). The term "proximate to" in the present application refers to a location where the optical inspector can accurately detect defects on the sample. The controller then causes the optical inspector to start the inspection process. The optical inspector detects a defect on the sample and communicates defect information associated with the detected defect to the controller. In one embodiment, the controller stores the defect information associated with the detected defect in a local memory included in or attached to the controller. In another embodiment, the controller stores the defect information associated with the detected defect in a memory included in or attached to the computer 15. The controller then causes the sample to be positioned away from the optical inspector and proximate to the 3-D microscope (as illustrated by the dashed line shown in FIG. 3). More precisely, the sample is positioned such that the 3-D microscope is focused on the same location on sample where the defect was detected by the optical inspector. The 3-D microscope then captures one or more images of the sample at the defect location. In one example, the image of the sample at the defect location is approximately one millimeter by one millimeter. An example of a captured image is illustrated in FIG. 6.

The positioning of the sample 13 can be achieved by various means. For example, the platform 14 on which the sample 13 rests, can be mounted to an electronically controlled truck that rides on a two-dimensional track, where the wheels of the truck are propelled by an electric motor. In another example, the platform 14 can be attached to an electronically controlled lever-arm. In either example, the controller 8 causes the platform 14 to be moved into a specific position by sending an electrical signal to a motor that moves the platform 14 to a different position.

In one embodiment, a human user can control the operation of the dual mode inspector 11 via display 16. In one example, the display 16 is a touch-screen display that allows the human user to select different options by touching the screen directly. In another example, the computer 15 includes other human input devices, such as a keyboard, mouse, or microphone (not shown). Either way, the human user is able to control when the dual mode inspector begins the defect detection processes. Once a defect is detected, the user is prompted with information associated with the detected defect. At that point, the human user can choose to capture an image of the sample at the location where the defect was detected. Alternatively, the human user can choose to not capture an image of the sample at the location where the defect was detected.

In another embodiment, the dual mode inspector 10 operates autonomously from human interaction. Rather, the dual mode inspector 10 is setup before inspection of the sample and then automatically inspects an inserted sample for defects and then automatically captures images of detected defects automatically. In this embodiment, due to the relatively large amount of time required to capture an image of a defect, the dual mode inspector will limit the total number of defect images that are captured. In one example, the dual mode inspector will only capture a certain number of images for each type of defect detected on the sample. In another example, the dual mode inspector will only capture images of detected defects that more than a certain distance apart. In yet another example, the dual mode inspector will only capture a certain number of images of detected defects of different types of defects within a specific area of the sample.

The sample 13 in FIG. 3 is approximately one millimeter thick and transparent. No other materials directly abut the top surface or bottom surface of the transparent sample. Rather, the top surface and bottom surface of the transparent sample abuts open air. Another typical means of supporting the transparent sample is to use a set of pins that support the bottom of the sample at regular intervals as shown in FIG. 10. It is noted herein, that other types of platforms exist and may be used to support a transparent sample. For example, a flat surface upon which the transparent sample rests may be used as a platform. In the flat surface example, the flat surface would contact the entire bottom surface of the transparent sample (therefore the bottom surface of the sample would not abut open air, but rather the transporting surface directly).

It is noted herein, the example of glass is used for exemplary use only. This disclosure is not limited to the detection of defects on glass. Rather, this disclosure is applicable to all transparent or opaque samples or wafers or discs regardless of the specific material constituting the sample/wafer/disc or the end device to be manufactured with the developed sample/wafer/disc. For example, silicon is opaque in the visible range of the spectrum but transparent in the infrared spectrum. Transparent or opaque samples may include at least the following materials: glass, plastic, quartz, sapphire, silicon, Silicon Carbide (SiC), and Gallium Nitride (GaN).

The use of 3-D microscope 3 is only exemplary in FIG. 3. A 3-D microscope can be replaced by a 2-D microscope to capture images of the detected defect as well. As such, the disclosure of this application is not limited to the use of a 3-D microscope to capture images of detected defects.

The dual mode inspector with a fixed platform shown in FIG. 1 and FIG. 2 as well as the dual mode inspector with a movable platform shown in FIG. 3 share the same benefit of performing (i) the detecting of a defect on a sample, and (ii) the capturing an image of the defect on the sample without removing the sample from the single platform. Performing these two different types of optical measurements while maintaining the alignment between the sample and the platform provide a tremendous advantage. First, as mentioned above, it is important to understand that the size of defects detected by the optical scanner can be as small as few micrometers in length. When a detected defect is only a few micrometers in length, a few micrometers in misalignment between the sample and platform can cause the defect not to be observed by the microscope that is focused on such a small defect area. This aspect of the present invention removes the misalignment between the sample and the platform that are caused by moving the sample between different platforms. This allows the dual mode inspectors of the present application to reliably capture images of selected defects while the sample remains on the same platform that held the sample when the defects were detected.

Partial Defect Image Capture Failure

As discussed above, due to the extremely small size of some defects detected by the optical inspector, a very small misalignment between the sample and the platform that supports the sample can cause part of a detected defect not to be properly captured by the microscope. An example of this is illustrated in FIG. 6. In operation, the optical inspector detects a defect a first location on the sample. The sample is then removed from the first platform and is mounted on a second platform that is part of a microscope. Due to the misalignment introduced due to the moving of the sample between two platforms (as shown in FIG. 10) causes the crack 21 to not be properly centered in the captured image 20. Rather, the crack 21 extends to the left-hand side of the captured image. Review of this captured image fails to allow the user to determine the exact length of the crack 21, because not all of the crack is captured in the image. In this situation, at least part of the crack is captured after the sample to platform misalignment. However, the user would need to manually adjust the position of the second platform with respect to the microscope to properly center the microscope view on the crack 21. This manual adjustment requires a large amount of time by the human user and can lead to measurement variability due to user error.

Total Defect Image Capture Failure

Figure 7:
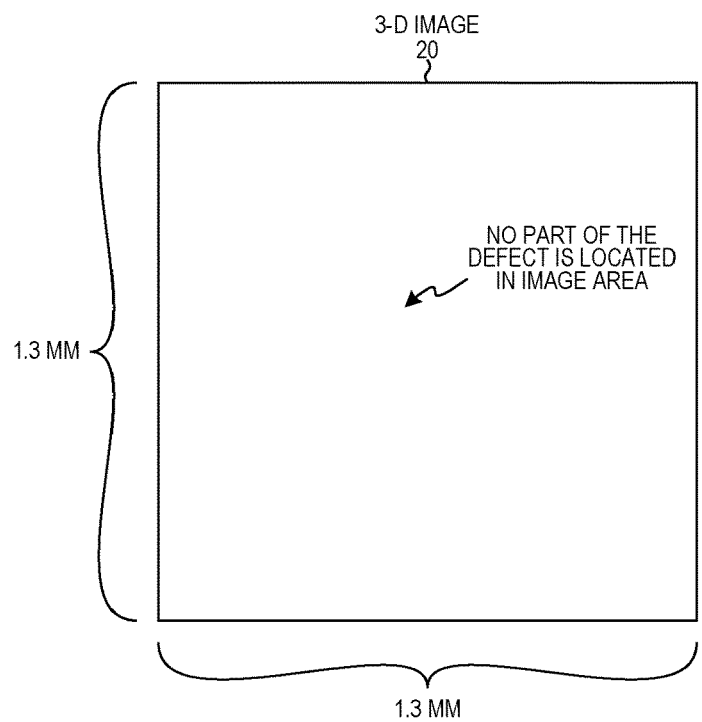
FIG. 7 is a diagram of a captured image centered at (X2,Y2).

A very small misalignment between the sample and the platform that supports the sample can cause a detected defect not to be captured at all by the microscope. As illustrated in FIG. 7, if the misalignment introduced by moving the sample from a first platform to a second platform is greater than the size of the detected defect itself, then the microscope may fail to capture an image of any part of the detected defect. This scenario is much more problematic than the partial defect image capture failure scenario, because in this total defect image capture failure scenario the microscope does not see any portion of the detected defect. Therefore, the human user does not have any indication as to how the platform should be moved so to center the microscope on the detected defect. In this total defect image capture failure scenario the user will not be able to capture an image of the detected defect, regardless of the amount of additional time spent adjusting the platform of the microscope.

Correction of Scanning Lens Distortion

Figure 8:
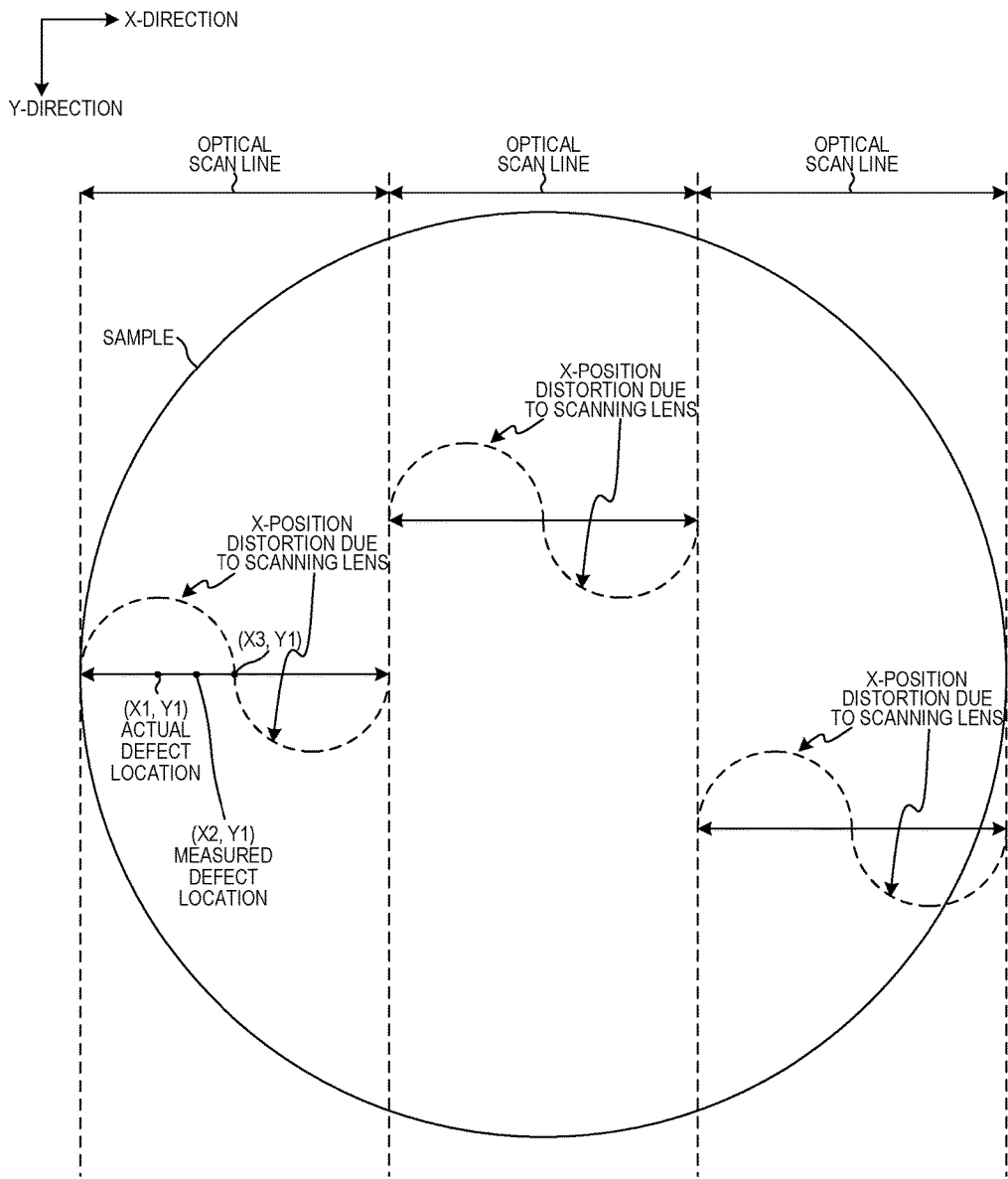
FIG. 8 is a diagram of x-direction distortion due to a scanning lens.

The optical inspector illustrated in FIG. 4 includes a telecentric scanning lens that redirects the light traveling between the rotating polygon and the sample. The telecentric scanning lens can introduce a small amount of error in the x-direction related to the location along the scan line. The optical scanning line is one path taken by the optical inspector across the length of the sample. This is also referred to as a "swath". Depending on the position along the optical scan line where a defect is detected, the measured x-position of the defect may have a certain amount of error from the actual location where the defect is located. One example of distortion produced along the optical scan line by the telecentric scanning lens is illustrated in FIG. 8. For example, position (X1,Y1) is the true location of a defect. However, due to the x-direction error introduced by the telecentric scanning lens along the line Y1, the measured location of the defect is (X2,Y1). Therefore, the x-direction error is X2 minus X1. Alternatively, at other points along the optical scan line there is virtually no x-direct error caused by the telecentric scanning lens. For example, as location (X3,Y1) the measured location is virtually identical to the actual location (X3, Y1).

Figure 9:
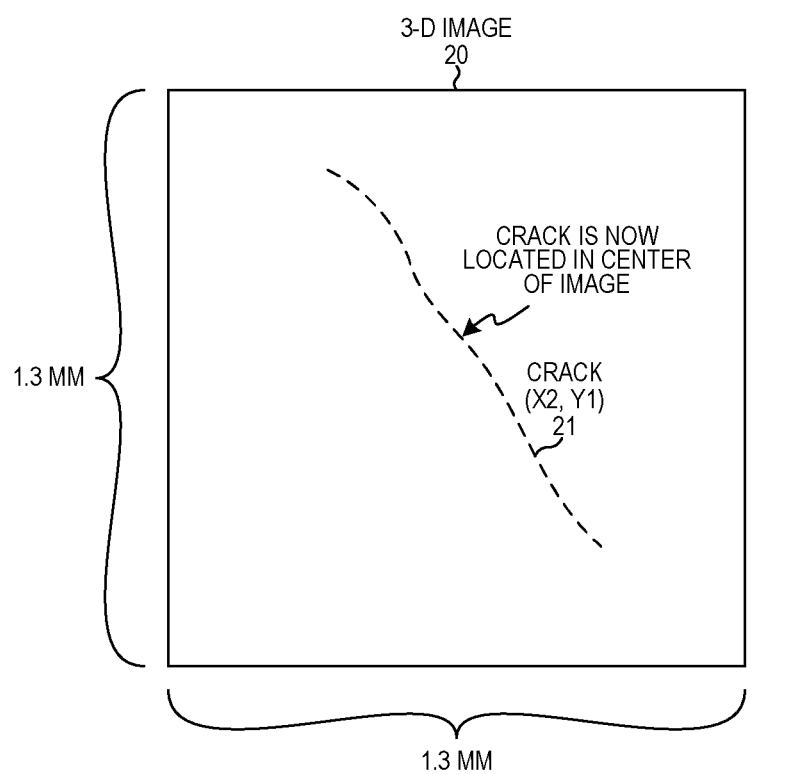
FIG. 9 is a diagram of a captured image centered at (X2,Y1).

If the x-direction error is not corrected, then the images captured at the measured defect locations may be improperly centered due to this x-direction error caused by the scanning lens. This is illustrated in FIG. 6. In FIG. 6, the defect located at (X1,Y1) is not properly centered in the captured image. Rather, the crack 21 extends to the left-hand side of the captured image. However, if the measured (X1,Y1) location is corrected to be (X2,Y1), then the resulting captured image at location (X2,Y1) is as is illustrated in FIG. 9. In FIG. 9 the microscope is focused on location (X2,Y1) and results in the detected defect crack 21 being properly centered in the captured image.

In one example, the x-direction error is removed, or at least minimized, by apply a third order best fit error correction algorithm. The algorithm estimates the amount of x-direction error introduced by the telecentric scanning lens and removes the estimated x-direction error from the measured X location, thereby generating a error corrected x-direction value X'. The corrected x-direction value X' is used to position the platform during capturing of the defect image by the microscope. In this fashion, the x-direction error introduced by the telecentric scanning lens is minimized and the accuracy of the captured image is greatly improved.

Third order best fit error correction is only one example of error correction that can be used. For more precise error correction, fourth order error correction can be used.

The scan lens distortion correction is accomplished by scanning a calibrated ruler (scale) with the optical inspector. The pixel locations of the 1 mm, 2 mm, 3 mm, etc., up to 100 mm ruler marks are recorded. Since the scan lens creates a slight distortion in the locations of the ruler marks, the pixel locations and the ruler marks are not exactly linearly related. The error between the ruler marks and the pixel locations are recorded and an error table is created which shows the difference between the pixel locations and the ruler marks. This error table is fitted with a third or fourth order best fit polynomial and is used to correct the optical inspector location so that the optical distortion is removed.

In one example, the scanning lens distortion correction is performed by a processor within the controller of the dual mode inspector. In another example, the scanning lens distortion correction is performed by a processor within the computer system. In yet another example, the scanning lens distortion correction is performed by a processor included in the optical inspector. In a different example, the scanning lens distortion correction is performed by a processor included in the microscope.

Figure 11:
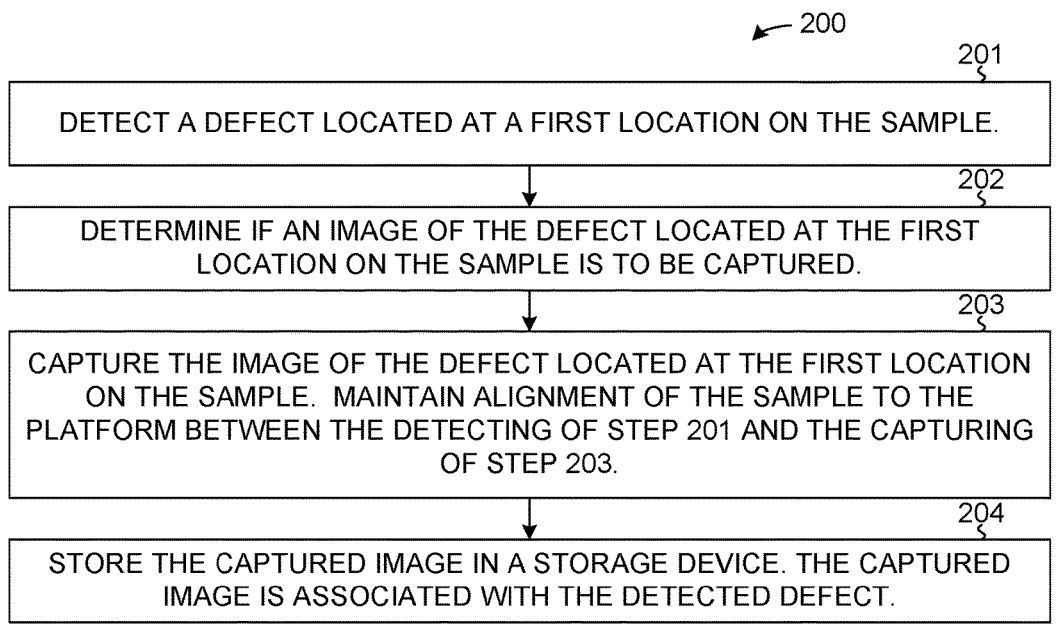
FIG. 11 is a flowchart of a dual mode inspector.

FIG. 11 is a flowchart 200 illustrating the steps included in the defect detection and image capturing process. In step 201, a defect is detected at a first location on a sample. In step 202, it is determined if an image of the defect located at the first location is to be captured. In step 203, an image of the defect located at the first location on the sample is captured. The alignment of the sample to the platform is maintained between steps 201 and 204. In step 204, the captured image is stored in a storage device.

Figure 12:
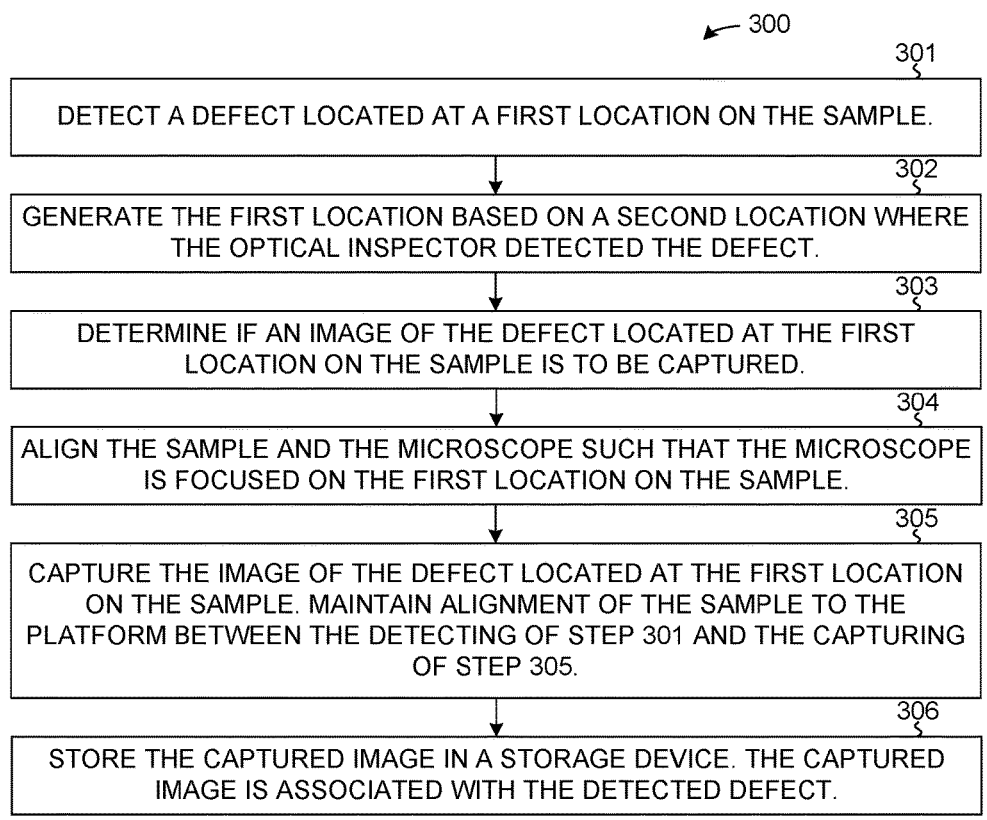
FIG. 12 is a flowchart of a dual mode inspector with scanning lens distortion correction.

FIG. 12 is a flowchart 300 illustrating the steps included in the defect detection and image capturing process with optical scan lens distortion correction. In step 301, a defect is detected at a first location on a sample that is supported by a platform. In step 203, the first location is generated based on a second location where the optical inspector detected the defect. In step 303, it is determined if an image of the defect located at the first location is to be captured. In step 304, the sample is aligned with a microscope so that the microscope is focused on the first location of the sample. The sample is not removed the platform during steps 301-304. In step 305, the image of the defect located at the first location on the sample is captured. The alignment between the sample and the platform is maintained between the detecting of step 301 and the capturing of step 305. In step 306, the captured image is stored in storage device.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A dual mode inspector, comprising:
    an optical inspector configured to detect existence of a defect located at a first location on a sample;
    wherein the optical inspector comprises:
        a telecentric scan lens configured to direct radiation reflected by a time varying beam reflector onto a first surface of a sample, wherein a portion of the radiation irradiates a second surface of the sample;
        a first detector configured to receive at least a portion of top surface specular reflection; and
        a second detector configured to receive at least a portion of the bottom surface specular reflection;
    a microscope configured to capture an image of the defect at the first location on the sample;
    a platform that is configured to support the sample, wherein the sample is not removed from the platform between the detecting of the existence of defect located at the first location on the sample and the capturing the image of the defect at the first location on the sample; and
    a controller that causes the optical inspector to detect the defect located at the first location on the sample and causes the microscope to capture the image of the defect at the first location on the sample.

2. The dual mode inspector of claim 1, wherein the platform is movable, wherein the platform is located at the focal plane of the optical inspector when the defect located at the first location on the sample is detected, and wherein the platform is located at the focal plane of the microscope when the image of the defect located at the first location on the sample is captured.

3. The dual mode inspector of claim 1, wherein the platform is stationary, wherein the optical inspector is located proximate to the platform when the defect located at the first location on the sample is detected, and wherein the microscope is located proximate to the platform when the image of the defect located at the first location on the sample is captured.

4. The dual mode inspector of claim 1, wherein the controller is a computer, comprising:
    a processor the executes instructions;
    a memory that stores instructions, defect information, and captured images;
    a first communication port configured to communicate with the optical inspector; and
    a second communication port configured to communicate with the microscope.

5. The dual mode inspector of claim 1, wherein the controller is a networking device that communicates data between the optical inspector and a computer system and communicates data between the microscope and the computer system.

6. The dual mode inspector of claim 1, wherein the controller communicates the first location on the sample to the microscope.

7. The dual mode inspector of claim 2, wherein the controller causes the platform to be moved.

8. The dual mode inspector of claim 3, wherein the controller causes the optical inspector to be moved, and wherein the controller causes the microscope to be moved.

9. The dual mode inspector of claim 4, wherein the computer further comprises a display that is configured to display defect information, and wherein the computer is configured to receive instructions to capture the image of the defect located at the first location on the sample.

10. The dual mode inspector of claim 1, wherein the optical inspector is setup to detect a defect located at a second location on the sample; wherein the optical inspector detects the defect located at the first location due to optical distortion; and wherein the controller converts the second location to the first location.

11. The dual mode inspector of claim 1, wherein the microscope is a three-dimensional microscope, and wherein the optical inspector includes a scan lens and a time varying beam reflector.

12. A method of dual mode inspection, comprising:
(a) detecting the existence of a defect located at a first location on a sample using an optical inspector; wherein the optical inspector comprises:
  a telecentric scan lens that directs radiation reflected by a time varying beam reflector onto a first surface of a sample, wherein a portion of the radiation irradiates a second surface of the sample;
  a first detector that receives at least a portion of top surface specular reflection; and
  a second detector that receives at least a portion of the bottom surface specular reflection;
(b) determining if an image of the defect located at the first location on the sample is to be captured;
(c) if it is determined that the image is to be captured in (b), then capturing an image of the defect located at the first location on the sample using a microscope that is not part of the optical inspector;
(d) if it is determined that the image is not to be captured in (b), then not capturing an image of the defect located at the first location on the sample;
(e) maintaining alignment of the sample to a platform that supports the sample between the detecting of (a) and the capturing of (c); and
(f) storing the captured image on a storage device, wherein the captured image is associated with the detected defect.

13. The method of claim 12, wherein the determining of (b) comprises:
  (b1) displaying an indication of the detected defect;
  (b2) displaying an option to capture an image of the detected defect;
  (b3) displaying an option to not capture an image of the detected defect; and
  (b4) receiving a capture image command.

14. The method of claim 13, wherein (b1) through (b4) are performed by a computer system, and wherein the receiving of (b4) is caused by a user input.

15. The method of claim 13, wherein the determining of (b) comprises:
  (b5) determining a characteristic of the detected defect;
  (b6) comparing the characteristic of the detected defect to a list of defect characteristics; and
  (b7) determining that the characteristic of the detected defect matches at least one characteristic included in the list of defect characteristics.

16. The method of claim 15, wherein (b5) through (b7) is performed by a computer system.

17. The method of claim 12, wherein the optical inspector, the microscope, and the platform are controlled by a controller and are included in a single enclosure.

18. The method of claim 17, wherein the optical inspector is configured to detect a defect located at a second location on the sample, wherein the optical inspector detects a defect located at the first location on the sample due to optical distortion of the optical inspector.

19. The method of claim 18, wherein the controller converts the second location on the sample to the first location where the defect is located on the sample.

20. A dual mode inspector, comprising
  an optical inspector that detects the existence of a defect located at a first location on a sample;
  wherein the optical inspector comprises:
  a telecentric scan lens that directs radiation reflected by a time varying beam reflector onto a first surface of a sample, wherein a portion of the radiation irradiates a second surface of the sample;
  a first detector that receives at least a portion of top surface specular reflection; and
  a second detector that receives at least a portion of the bottom surface specular reflection;
  a microscope that captures an image of the defect located at the first location on the sample, wherein the optical inspector and the microscope are included in a single enclosure, and wherein the captured image is not used to detect the existence of the defect;
  a first means for maintaining alignment of the sample on a platform during the time between detecting of the defect and the capturing of the image; and
  a second means for converting a second location where the optical inspector is setup to detect a defect on the sample to a first location on the sample where the defect is located.

21. The dual mode inspector of claim 20, wherein the first means includes a platform that supports the sample, and wherein the sample is not removed from the platform between the detecting of the defect and the capturing of the image of the defect.

22. The dual mode inspector of claim 20, wherein the second means includes a controller, wherein the controller converts the second location on the sample to the first location on the sample, thereby correcting optical distortion of the optical inspector.

* * * * *